(12) United States Patent
Takahashi

(10) Patent No.: US 10,051,241 B2
(45) Date of Patent: Aug. 14, 2018

(54) METHOD AND APPARATUS FOR IMAGE COMBINATION AND DISPLAYING THE COMBINED IMAGE

(71) Applicant: Sony Corporation, Tokyo (JP)

(72) Inventor: Masahiro Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 476 days.

(21) Appl. No.: 13/926,464

(22) Filed: Jun. 25, 2013

(65) Prior Publication Data

US 2014/0036058 A1 Feb. 6, 2014

(30) Foreign Application Priority Data

Jul. 31, 2012 (JP) ................................ 2012-169607

(51) Int. Cl.
| | | |
|---|---|---|
| *H04N 7/18* | (2006.01) | |
| *G02B 21/36* | (2006.01) | |
| *G06T 3/40* | (2006.01) | |

(52) U.S. Cl.
CPC ............ *H04N 7/18* (2013.01); *G02B 21/367* (2013.01); *G06T 3/4038* (2013.01); *G06T 2207/10056* (2013.01)

(58) Field of Classification Search
CPC ...... H04N 7/18; G02B 21/365; G02B 21/367; G01N 21/6458; H01J 37/28; H01J 37/224
USPC .................................................... 348/80, 79
See application file for complete search history.

(56) References Cited

U.S. PATENT DOCUMENTS

| | | | | |
|---|---|---|---|---|
| 6,101,238 A | * | 8/2000 | Murthy, Sr. ............ | G01N 23/04 378/62 |
| 6,879,096 B1 | * | 4/2005 | Miyazaki .............. | G09G 3/2011 313/292 |
| 2003/0107586 A1 | * | 6/2003 | Takiguchi ............. | G06T 3/4038 345/629 |
| 2005/0264650 A1 | * | 12/2005 | Park ........................ | H04N 1/21 348/36 |
| 2007/0081231 A1 | * | 4/2007 | Shirota ................ | G02B 21/367 359/380 |
| 2007/0165141 A1 | * | 7/2007 | Srinivas .............. | G06F 3/04845 348/571 |
| 2009/0174795 A1 | * | 7/2009 | Kato ................... | H04N 5/23222 348/234 |
| 2010/0040266 A1 | * | 2/2010 | Perz ..................... | G06K 9/0014 382/128 |
| 2010/0121561 A1 | * | 5/2010 | Kodaira ................ | G01C 11/02 701/532 |

(Continued)

FOREIGN PATENT DOCUMENTS

JP 2011-133849 7/2011

*Primary Examiner* — Jay Patel
*Assistant Examiner* — Marnie Matt
(74) *Attorney, Agent, or Firm* — Chip Law Group

(57) ABSTRACT

There is provided an information processing apparatus, including an image combination section which connects a plurality of partial images, each of which is an image obtained by imaging a part of a region to be observed, and a connection information generation section which generates connection information of a combined image combined by the image combination section. The connection information is provided, along with the combined image or separately from the combined image, to an image display apparatus capable of displaying the combined image.

12 Claims, 19 Drawing Sheets

(56) References Cited

U.S. PATENT DOCUMENTS

| | | | |
|---|---|---|---|
| 2011/0025840 A1* | 2/2011 | Fiegler | G01N 21/9027 348/127 |
| 2011/0049386 A1* | 3/2011 | Kishima | G01N 21/6458 250/458.1 |
| 2011/0102300 A1* | 5/2011 | Wood | H04N 9/3147 345/1.3 |
| 2011/0102572 A1* | 5/2011 | Kihara | G02B 21/244 348/79 |
| 2011/0194748 A1* | 8/2011 | Tonomura | A61B 5/0048 382/131 |
| 2011/0205353 A1* | 8/2011 | Fujisawa | H01J 37/222 348/80 |
| 2011/0304741 A1* | 12/2011 | Kawakami | G02B 21/367 348/222.1 |
| 2012/0069049 A1* | 3/2012 | Howe | G06T 7/0012 345/629 |

\* cited by examiner

1: DIGITAL MICROSCOPE
2: INFORMATION PROCESSING APPARATUS
3: SERVER
4: IMAGE DISPLAY APPARATUS
5: NETWORK

111~113: COMBINED IMAGES
114a, 114b: CONNECTION INFORMATION

FIG. 11
A 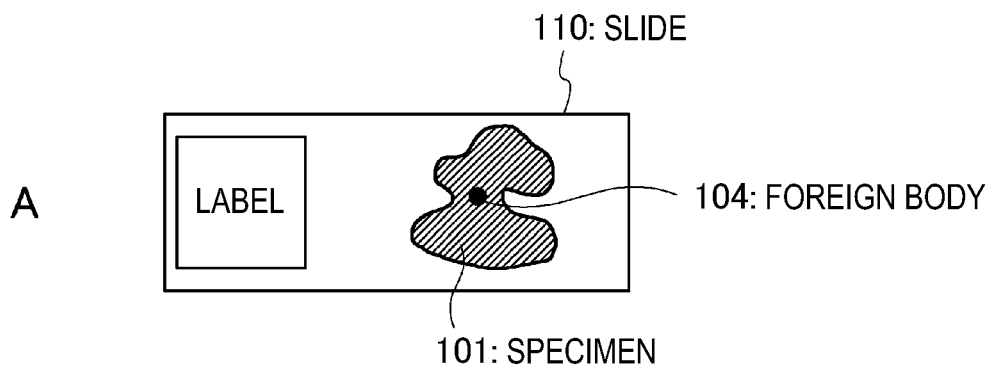
B 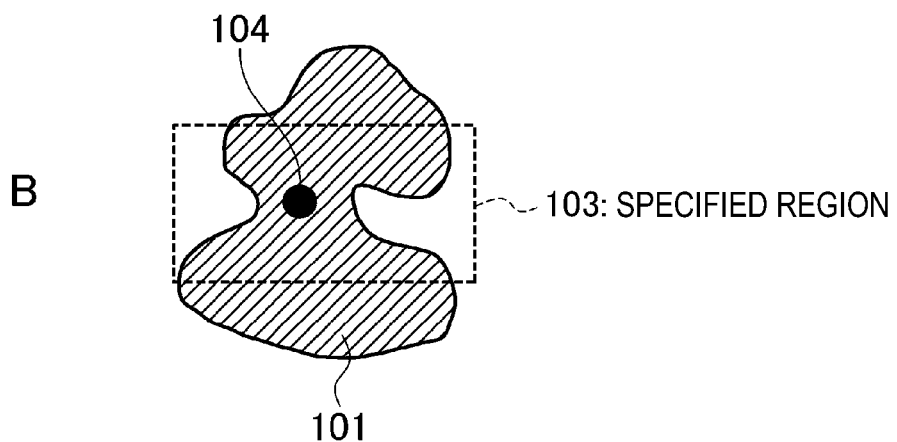
C 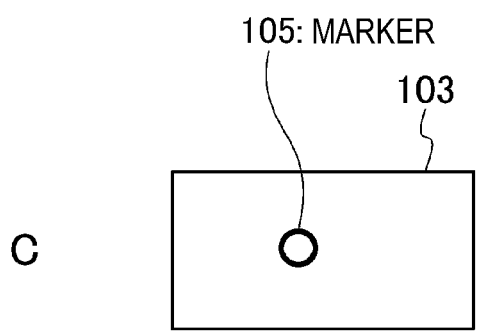

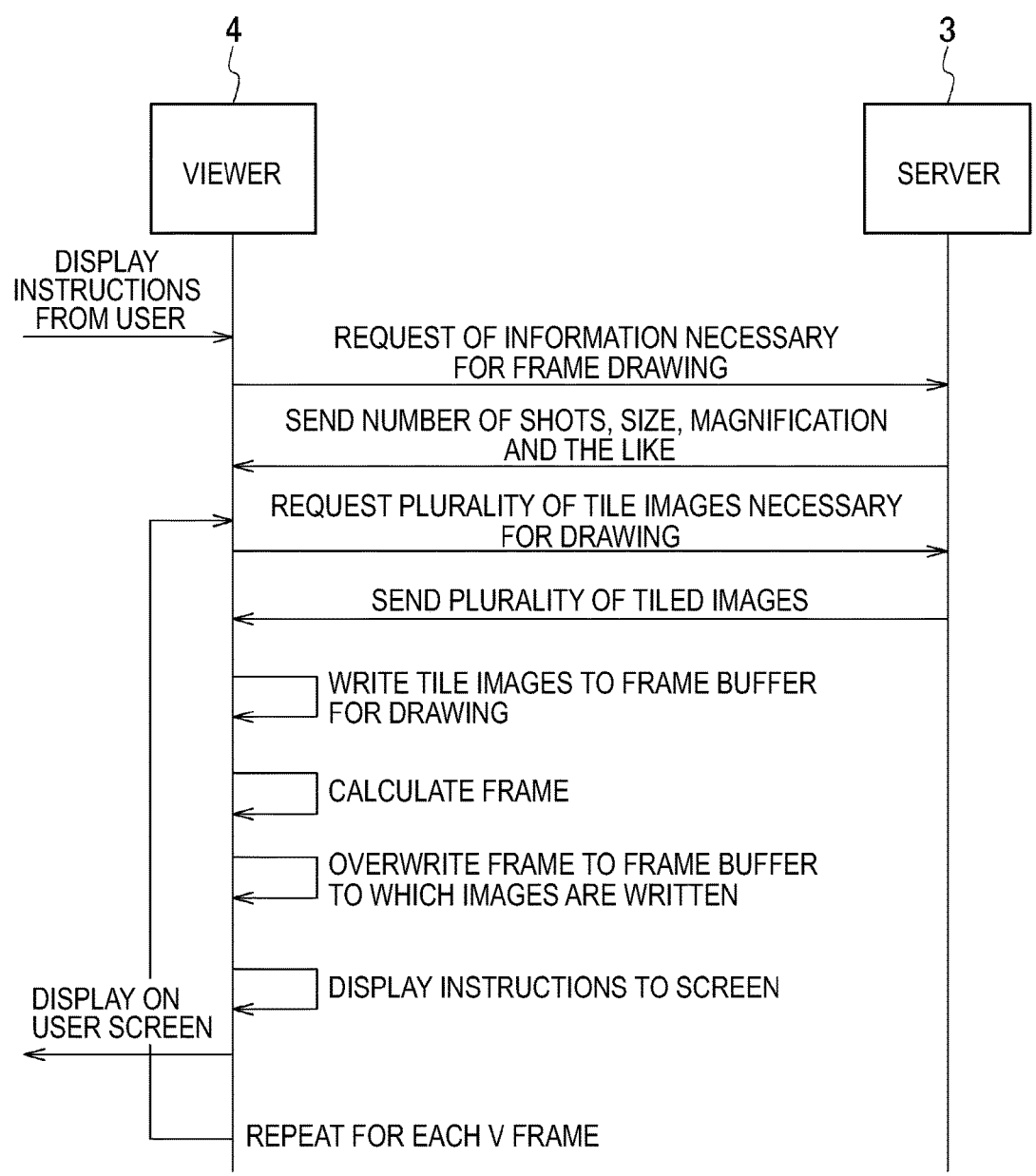

BASIC MAGNIFICATION: M
IMAGE PER 1 SHOT (WIDTH, HEIGHT): ShotWidth, ShotHeight (EXAMPLE 1000, 800)
NUMBER OF SHOTS (WIDTH, HEIGHT): ShotX, ShotY (EXAMPLE 3, 3)

B

SCREEN TO WHICH THICK FRAME IS DISPLAYED BY VIEWER
UPPER LEFT IS ORIGIN OF GIGANTIC IMAGE SYSTEM
UPPER LEFT POINT OF VIEWER SCREEN, GIGANTIC IMAGE SYSTEM (x,y)
(ALREADY KNOWN)
UPPER LEFT POINT OF VIEWER SCREEN, VIEWER SCREEN SYSTEM, (O, O)
VIEWER PIXELS (WIDTH, HEIGHT) WindowWidth, WindowHeight
(EXAMPLE 2000, 1000)

C

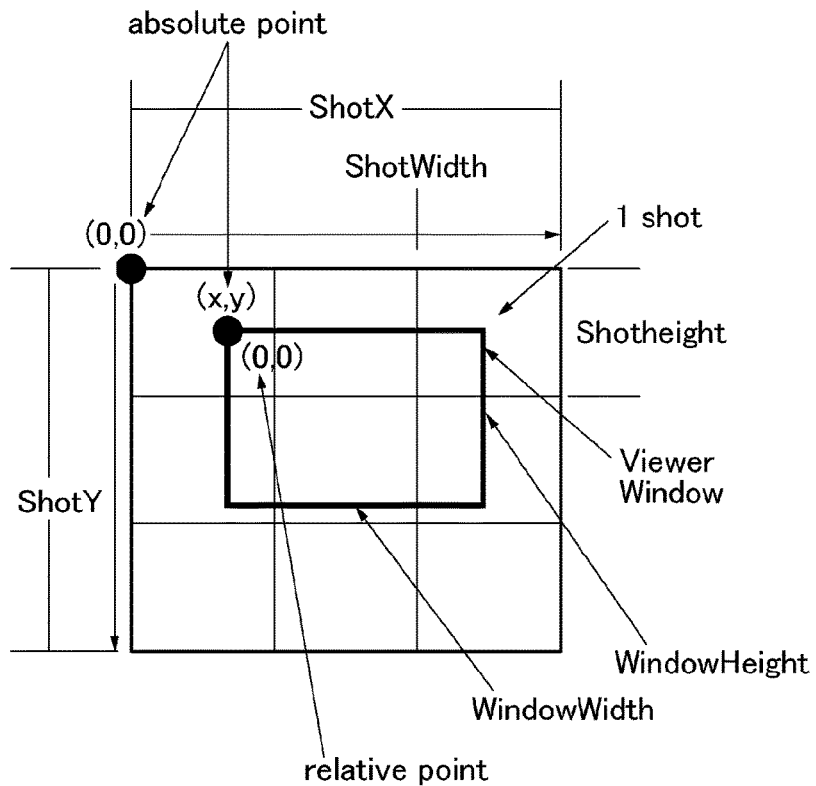

A

B
TILE SIZE (WIDTH, HEIGHT): TileWidth, TileHeight
HAVING THE FOLLOWING INFORMATION FOR
EACH OF A PLURALITY OF MAGNIFICATIONS
   MAGNIFICATION: M
   START POSITION OF VERTICAL LINE: (vx, vy)
   LENGTH OF VERTICAL LINE: Vlength
   START POSITION OF HORIZONTAL LINE: (hx, hy)
   LENGTH OF HORIZONTAL LINE: Hlength

FIG. 20
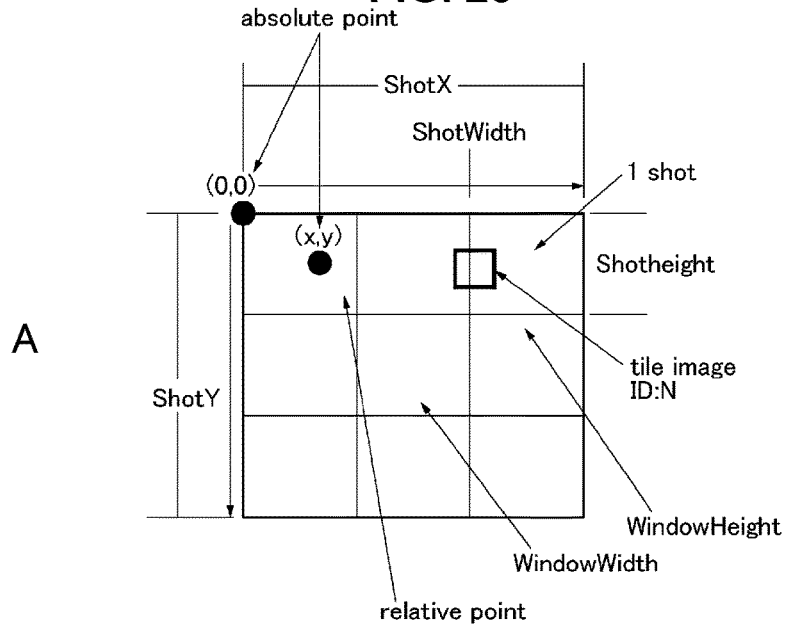
A
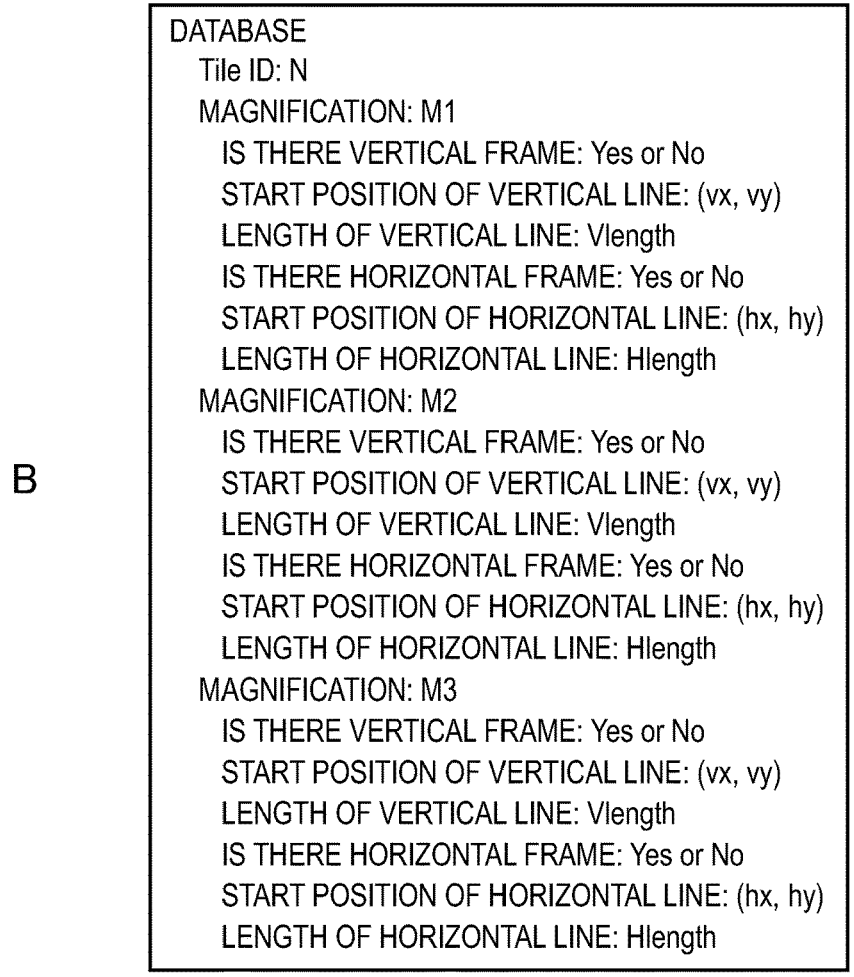
B

METHOD AND APPARATUS FOR IMAGE COMBINATION AND DISPLAYING THE COMBINED IMAGE

BACKGROUND

The present disclosure relates to an information processing apparatus, an information processing method, a program, and an image display apparatus which controls the display of images imaged by a microscope. More specifically, the present disclosure relates to technology which performs division imaging of regions to be observed, and combines and displays a wide-field microscopic image by connecting a plurality of obtained partial images.

In order to obtain microscopic observation images with a wide-field and of a high magnification, in the fields of medical treatment, pathology, biology, materials and the like, technology has been used which performs division imaging of regions to be observed by a digital microscope, and connects a plurality of obtained partial images. A virtual microscope system using this technology has been of particular interest in tissue/cell examination applications in pathological diagnosis, since an obtained microscopic observation image can be displayed for a user at an arbitrary position and with an arbitrary magnification, or can be displayed at a separate location via a network.

Accordingly, in the related art, in order to improve convenience for the user, technology has been proposed which displays various types of information along with a microscopic observation image on a display section (refer to JP 2001-181015A and JP 2011-133849A). For example, in the pathological diagnosis system disclosed in JP 2001-181015A, attribute information of a specimen, necessary diagnostic region information and the like are displayed in addition to a stained specimen image (microscopic observation image), and a user (such as a pathologist) confirms this information together with the microscopic observation image, and makes a diagnosis.

On the other hand, in the information processing apparatus disclosed in JP 2011-133849A, annotation display information, which visually reflects position information of a specific part, such as a part where there is a risk of disease, is combined with a microscopic observation image. In this information processing apparatus, prevention of an oversight by an observer has been attempted by displaying image data which includes annotation marks on a display section.

SUMMARY

In the above described virtual microscope systems of the related art, there is the possibility that images with a low reliability, which originates from distortions of the distortion corrections, distortions due to deviations of the imaging magnification, blurring, errors of the connection accuracy or the like, will be present in the connected parts of the partial images. When such images with a low reliability are used for diagnosis or the like, it becomes less possible to obtain a correct result. However, in the virtual microscope systems of the related art, since the connected parts of the partial images are not displayed on a viewer, a user is not able to recognize which parts include images with a low reliability.

Accordingly, it is desirable in the present disclosure to provide an information processing apparatus, an information processing method, a program, and an image display apparatus in which a user is easily capable of recognizing the reliability of connected parts, for a combined image generated by connecting a plurality of digital images.

According to an embodiment of the present disclosure, there is provided an information processing apparatus including an image combination section which connects a plurality of partial images, each of which is an image obtained by imaging a part of a region to be observed, and a connection information generation section which generates connection information of a combined image combined by the image combination section. The connection information is provided, along with the combined image or separately from the combined image, to an image display apparatus capable of displaying the combined image.

The connection information may include at least a connection position of the partial image and a connection reliability in the connection positions.

Further, information related to the connection reliability may be a connection accuracy and/or a presence or absence of distortion of each partial image.

Further, a display mode of the connection information may be additionally changed based on the information related to the connection reliability.

Further, the connection information additionally may include information related to a presence or absence of a foreign body and/or a position of the foreign body.

The information processing apparatus may further include an input information storage section which stores information related to the combined image input by a user. The information stored in the input information storage section may be also provided to the image display apparatus along with the connection information.

According to an embodiment of the present disclosure, there is provided an information processing method including connecting, by an image combination section, a plurality of partial images, each of which is an imaged part of a region to be observed, generating, by a connection information generation section, connection information of a combined image combined by the image combination section, and providing the connection information, along with the combined image or separately from the combined image, to an image display apparatus capable of displaying the combined image.

According to an embodiment of the present disclosure, there is provided a program for causing an information processing apparatus to execute an image combination function which connects a plurality of partial images, each of which is an imaged part of a region to be observed, a connection information generation function which generates connection information of a combined image combined by the image combination section, and a function which provides the connection information, along with the combined image or separately from the combined image, to an image display apparatus capable of displaying the combined image.

According to an embodiment of the present disclosure, there is provided an image display apparatus including an image acquisition section which acquires a combined image obtained by connecting a plurality of partial images, each of which is an imaged part of a region to be observed, a connection information acquisition section which acquires connection information of the combined image, and a display section which displays the combined image and/or the connection information.

The connection information may include at least a connection position of the partial image and a connection reliability in the connection position.

Further, the image display apparatus may further include a connection information processing section which determines a display mode of the connection position based on information related to the connection reliability. The display section may display the connection position by the display mode determined by the connection information processing section.

Further, the image display apparatus may further include an information input section to which a user inputs information related to the combined image.

According to the present disclosure, it becomes possible for a user to easily recognize the reliability of connected parts, for a combined image generated by connecting a plurality of digital images, in order to generate connection information of partial images separately from the combined image.

BRIEF DESCRIPTION OF THE DRAWINGS

FIGS. 11A to 11C are figures which show display examples of connection information, where A shows an entire slide, B shows an entire combined image, and C shows a state of displaying on a display section;

FIG. 14 is a figure which shows the flow for displaying connection information;

FIG. 15A to 15C is a figure which shows a connection information example provided from the server 3 to the image display apparatus 4;

FIGS. 20A and 20B are figures which show another connection information example provided from the server 3 to the image display apparatus 4.

DETAILED DESCRIPTION OF THE EMBODIMENT(S)

Figure 1:
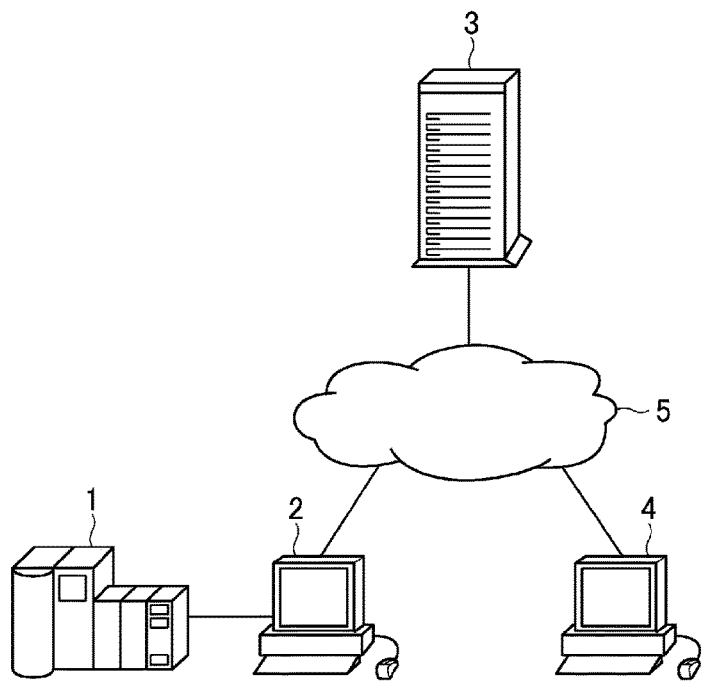
FIG. 1 is a figure which shows an outline for a microscope system of a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will be given in the following order.

1. The First Embodiment
(Example of determining a display mode of connection information in a viewer)
2. The Second Embodiment
(Example of determining a display mode of connection information in a server)

The First Embodiment

[Configuration of the Microscope System]

First, a virtual microscope system according to a first embodiment of the present disclosure will be described. FIG. 1 is a figure which shows an outline for the microscope system of the present embodiment. The microscope system of the present embodiment observes various prepared specimens by imaging the specimens with a high magnification, and is constituted of, for example, a digital microscope 1, an information processing apparatus 2, an image display apparatus 4 and the like.

In the microscope system of the present embodiment, the information processing apparatus 2 and the image display apparatus 4 may be directly connected to each other, or they may be connected to each other via a network 5. Further, the information processing apparatus 2 and the image display apparatus 4 may be mutually and communicably connected to a server 3 via the network 5. In addition, while only one image display apparatus 4 is shown in the configuration shown in FIG. 1, two or more image display apparatuses 4 may be connected to each other, or the information processing apparatus 2 may serve as an image display apparatus 4.

While it is possible for the virtual microscope system of the present embodiment to be applied to the various fields of medical treatment, pathology, biology, materials and the like, in the case where it is used for pathological diagnosis, for example, an object to be observed is an internal organ, tissues, cells or the like of a living body, and these sections are enclosed in a prepared specimen. Also, for example, in the case where the prepared specimen is a pathological specimen, a user of the image display apparatus 4 (an inspector of the images) is a doctor or the like, and a pathological diagnosis is made based on the displayed images.

[Digital Microscope 1]

Figure 2:
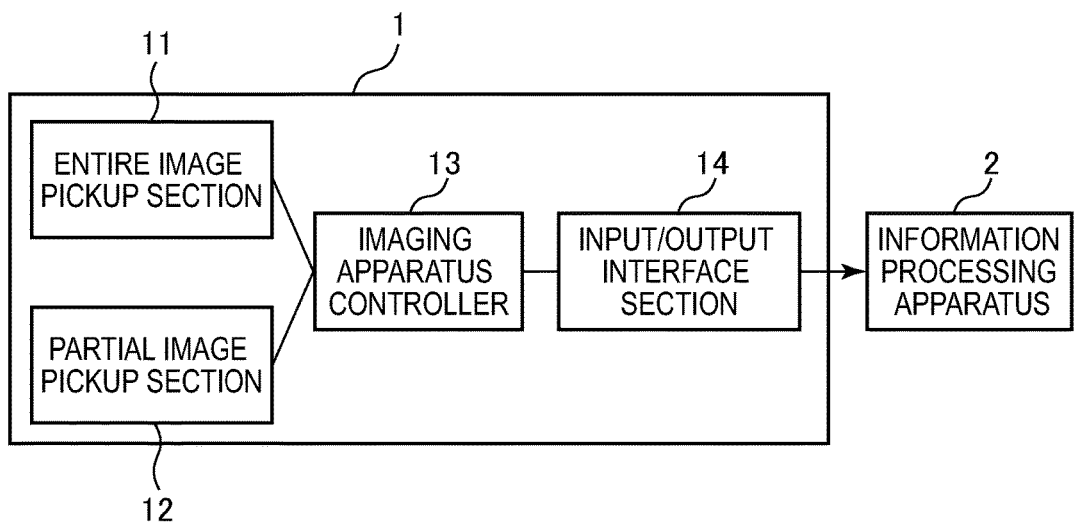
FIG. 2 is a block diagram which shows a configuration example of the digital microscope 1 shown in FIG. 1.

The digital microscope 1 includes a light source, an objective lens, an imaging sensor, a stage and the like, irradiates prescribed illumination light for the prepared specimen mounted on the stage, and images light through an object to be observed, light originating from an object to be observed, and the like. FIG. 2 is a block diagram which shows a configuration example of the digital microscope 1.

As shown in FIG. 2, an entire image pickup section 11 and a partial image pickup section 12 are included in the digital microscope 1 of the microscope system of the present embodiment.

The entire image pickup section 11 is constituted of a light source, a low magnification objective lens, a low resolution imaging element and the like, and images an entire image to be observed of the prepared specimen mounted on the stage with a low magnification and a low resolution. On the other hand, the partial image pickup section 12 is constituted of a light source, a high magnification objective lens, a high resolution imaging element and the like, and images parts of a region to be observed of the prepared specimen mounted on the stage with a high magnification and a high resolution. That is, a low resolution entire image (thumbnail image), and high resolution partial images (slide images) are imaged by the digital microscope 1.

Further, an imaging apparatus controller 13 which controls the imaging processes by the entire image pickup section 11 and the partial image pickup section 12, and an input/output interface section 14 for connecting with the information processing apparatus 2, may be included in the digital microscope 1. By including the input/output interface section 14, it becomes possible for input of control commands from the information processing apparatus 2, and for output of each image data imaged by the entire image pickup section 11 and the partial image pickup section 12 to the information processing apparatus 2.

[Information Processing Apparatus 2]

Figure 3:
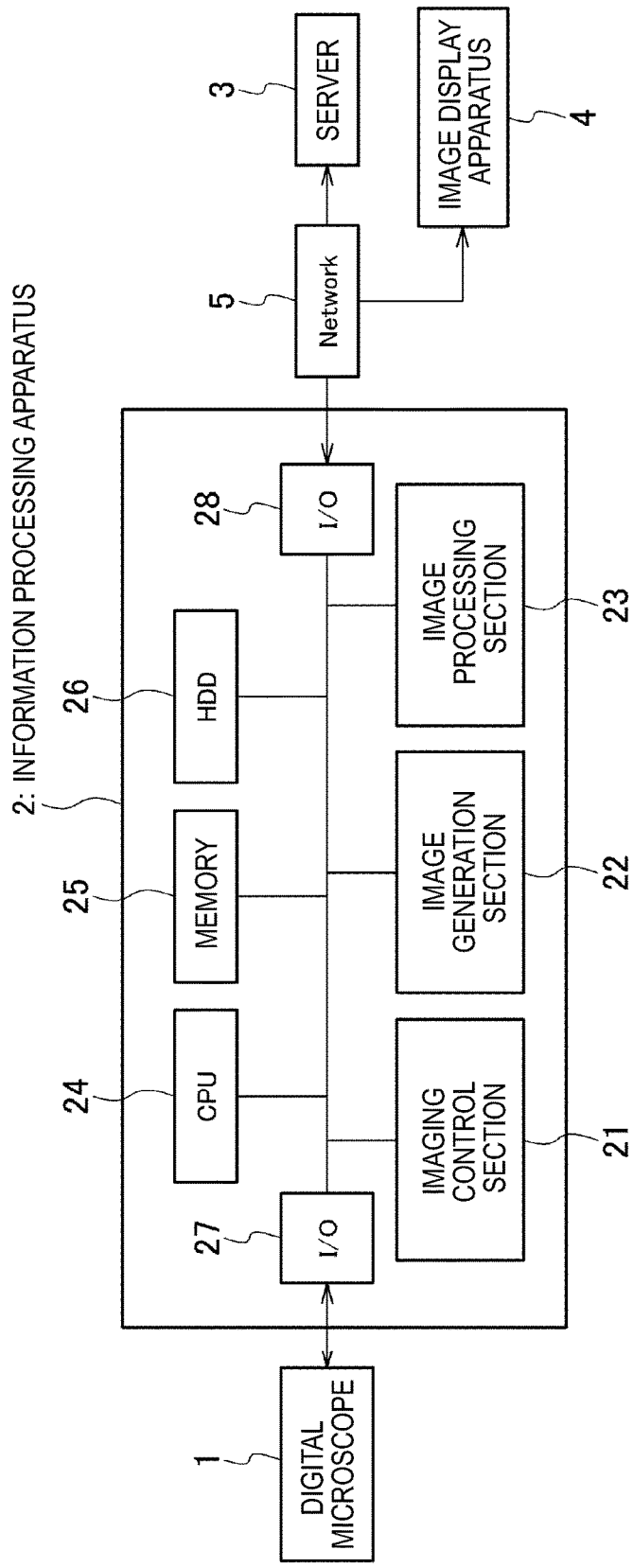
FIG. 3 is a block diagram which shows a configuration example of the information processing apparatus 2 shown in FIG. 1.

FIG. 3 is a block diagram which shows a configuration example of the information processing apparatus 2. As shown in FIG. 3, an image generation section 22, which connects the partial images (slide images) imaged by the digital microscope 1, is included in the information processing apparatus 2. Further, an imaging control section 21, an image processing section 23, a CPU (Central Processing Unit) 24, a memory 25, a hard disk 26, and input/output interface sections 27, 28 may also be included in this information processing apparatus 2.

(Image Generation Section 22)

Figure 4:
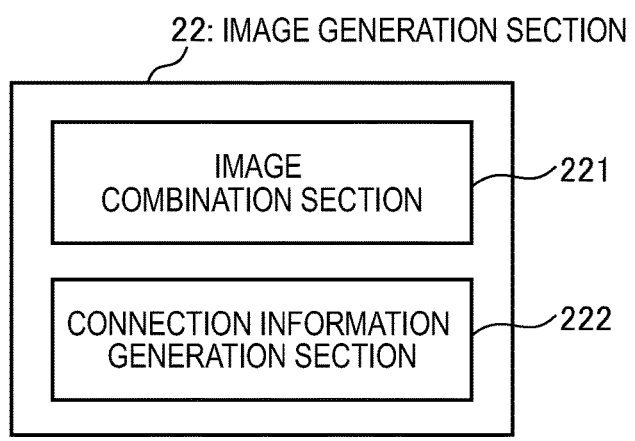
FIG. 4 is a block diagram which shows a configuration example of the image generation section 22 shown in FIG. 3.

FIG. 4 is a block diagram which shows a configuration example of the image generation section 22. As shown in FIG. 4, the image generation section 22 includes an image combination section 221 which connects a plurality of partial images (slide images), each of which is an image obtained by imaging a part of a region to be observed, and a connection information generation section 222 which generates connection information of a combined image combined by the image combination section 221.

In the image combination section 221, a high magnification and high resolution wide-field microscopic observation image is combined by connecting the plurality of partial images (slide images) imaged by the digital microscope 1. Specifically, a matching process is performed for the partial images (slide images) to be combined, and a connection (stitching) process of the partial images (slide images) is performed based on this result.

On the other hand, in the connection information generation section 222, for example, information related to a connection position of each of the partial images (slide images), and information related to a connection reliability in each of the connection positions, are created, as connection information, for the combined image combined by the image combination section 221. Further, information related to the presence or absence of foreign bodies, and the positions of the foreign bodies, may be included in the connection information.

Here, the connection accuracy, the presence or absence of distortions and the like of each partial image (slide image) can be included as information related to the connection reliability. For example, in the case of the connection accuracy, a deviation amount for each pixel of a pattern matching area in the matching process is acquired as connection reliability information. In this case, the connection reliability will increase as the deviation amount decreases.

Further, a relative deviation amount between adjacent partial images (slide images) occurring in the stitching process can be acquired as connection reliability information. In this case, the connection reliability will be low in the case where the relative deviation amount is large, and the connection reliability will increase as the deviation amount decreases. In addition, in the case where the deviation amount of each partial image (slide image) calculated at the time of the stitching process is substantially higher than the deviation amount estimated from the position accuracy at the time of imaging, it can be judged that the reliability of the stitching process is low. Such an increase of the deviation amount in the stitching process occurs, for example, due to an accumulation of deviations or in the case where the stitching process is performed on blurred images.

Other than this, position information or the like of parts with low connection reliabilities can be acquired as connection reliability information, such as parts which connect partial images (slide images) without matching or without performing a matching process, or parts in which foreign bodies are present.

Also, the combined image (wide-field microscopic observation image) combined by the image combination section 221, and various types of connection information generated by the connection information generation section 222, are output to the server 3 and the image display apparatus 4, via the input/output interface section 28 and the network 5.

(Imaging Control Section 21)

The imaging control section 21 controls the driving of the digital microscope 1 when imaging partial images (slide images) or an entire image (thumbnail image), and controls the operations of the image generation section 22, the image processing section 23 and the like.

(Image Processing Section 23)

In the image processing section 23, analysis of the entire image (thumbnail image) which images the entire region to be observed, creation of a sequence (imaging sequence) which images the partial images by the digital microscope 1, and the like are performed. The imaging sequence created here is output to the imaging control section 21.

(CPU 24)

The CPU 24 collectively controls each section included in the information processing apparatus 2, and executes programs which collectively control, for example, the above described image processing section 23, the imaging control section 21 and the like. Further, the CPU 24 can perform operation processes executed by each section of the information processing apparatus 2, and can perform a pattern matching process or the like of the partial images executed by an encoder of the images or the above described image combination section 221.

(Memory 25)

The memory 25 is used as a work region of the CPU 24, and temporarily stores the partial images (slide images) and the entire images (thumbnail images) imaged by the digital microscope 1 and input from the input/output interface section 27.

(Hard Disk 26)

For example, the processing results (the imaging sequence and the like) by the image processing section 23, the combined images (microscopic observation images) combined by the image combination section 221, the connection information generated by the connection information generation section 222 and the like are stored on the hard disk 26.

Note that a part or all of this data can be stored in the server 3 on the network 5. In this case, an interface 28 for connecting with the server 3 may be included in the information processing apparatus 2, and may be mutually and communicably set via the network 5.

Further, it is possible to create computer programs for implementing each of the functions of the above described information processing apparatus 2, and it is possible to implement the computer programs in a personal computer or the like. Such computer programs may be stored, for example, on a recording medium such as a magnetic disk, an optical disc, a magneto-optical disc, or a flash memory, or can be delivered via a network.

[Server 3]

Figure 5:
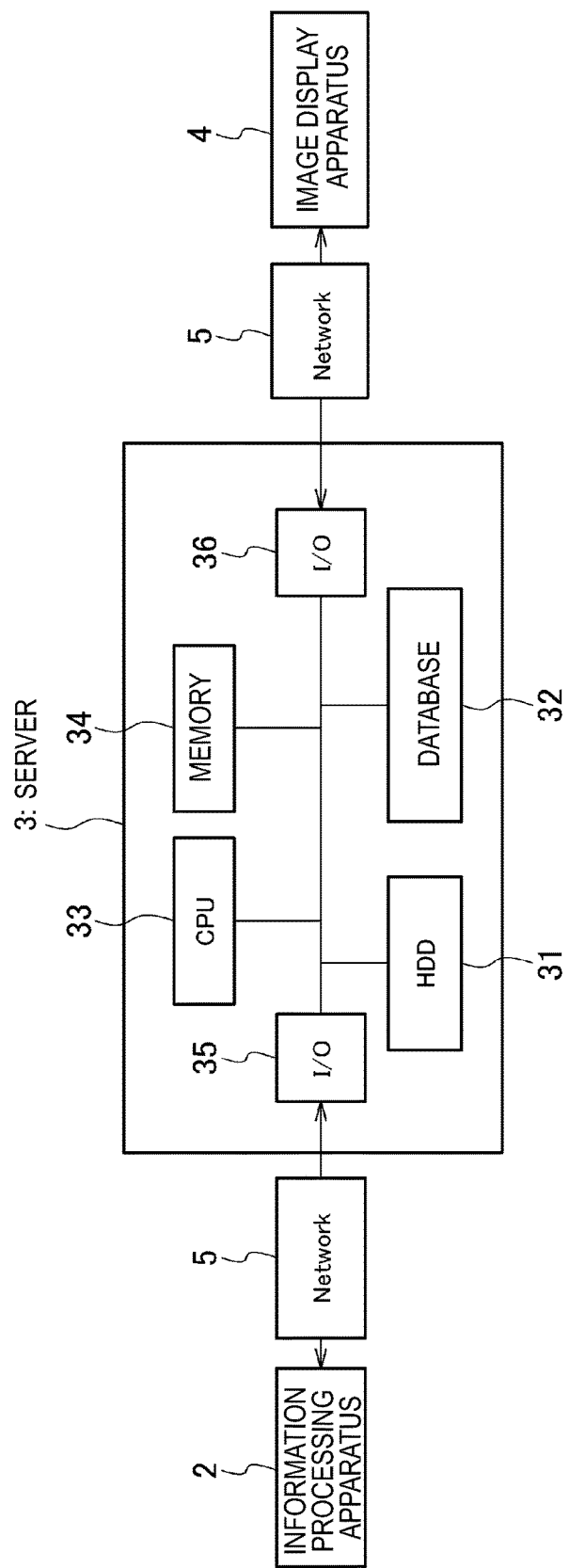
FIG. 5 is a block diagram which shows a configuration example of the server 3 shown in FIG. 1.

The server 3 manages various data uploaded from the information processing apparatus 2, and outputs the data to the image display apparatus 4 and the information processing apparatus 2 as necessary. FIG. 5 is a block diagram which shows a configuration example of the server 3. As shown in FIG. 5, the server 3 is connected to the information processing apparatus 2 and the image display apparatus 4 via the network 5, and is constituted of a hard disk 31, a database 32, a CPU 33, a memory 34, and input/output interface sections 35, 36.

(Database 32)

Combined images (wide-field microscopic observation images) generated by the image generation section 22 of the information processing apparatus 2, connection information, various information related to the combined images (for example, size and the like), entire images (thumbnail images) and the like are stored in the database 32. Also, the server 3 exchanges this information, for example, with the image display apparatus 4 via the network 5.

[Image Display Apparatus 4]

Figure 6:
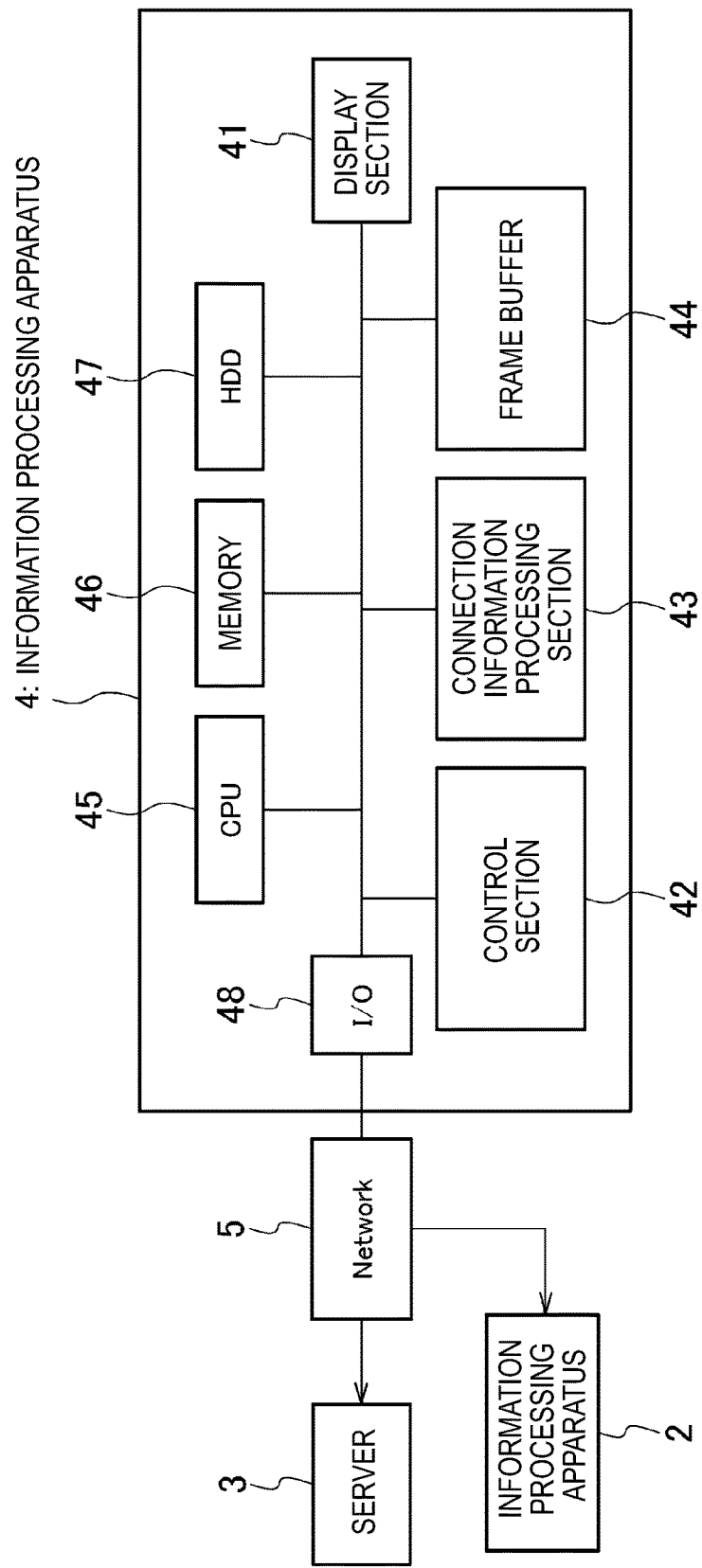
FIG. 6 is a block diagram which shows a configuration example of the image display apparatus 4 shown in FIG. 1.

FIG. 6 is a block diagram which shows a configuration example of the image display apparatus 4. As shown in FIG. 6, the image display apparatus 4 is connected to the information processing apparatus 2 and the server 3 via the network 5, and is constituted of a display section 41, a control section 42, a connection information processing section 43, a frame buffer 44, a CPU 45, a memory 46, a hard disk 47, and an input/output interface section 48.

(Display Section 41)

The display section 41 displays a combined image (microscopic observation image) and connection information, and may be capable of displaying this image and information.

(Connection Information Processing Section 43)

Figure 7:
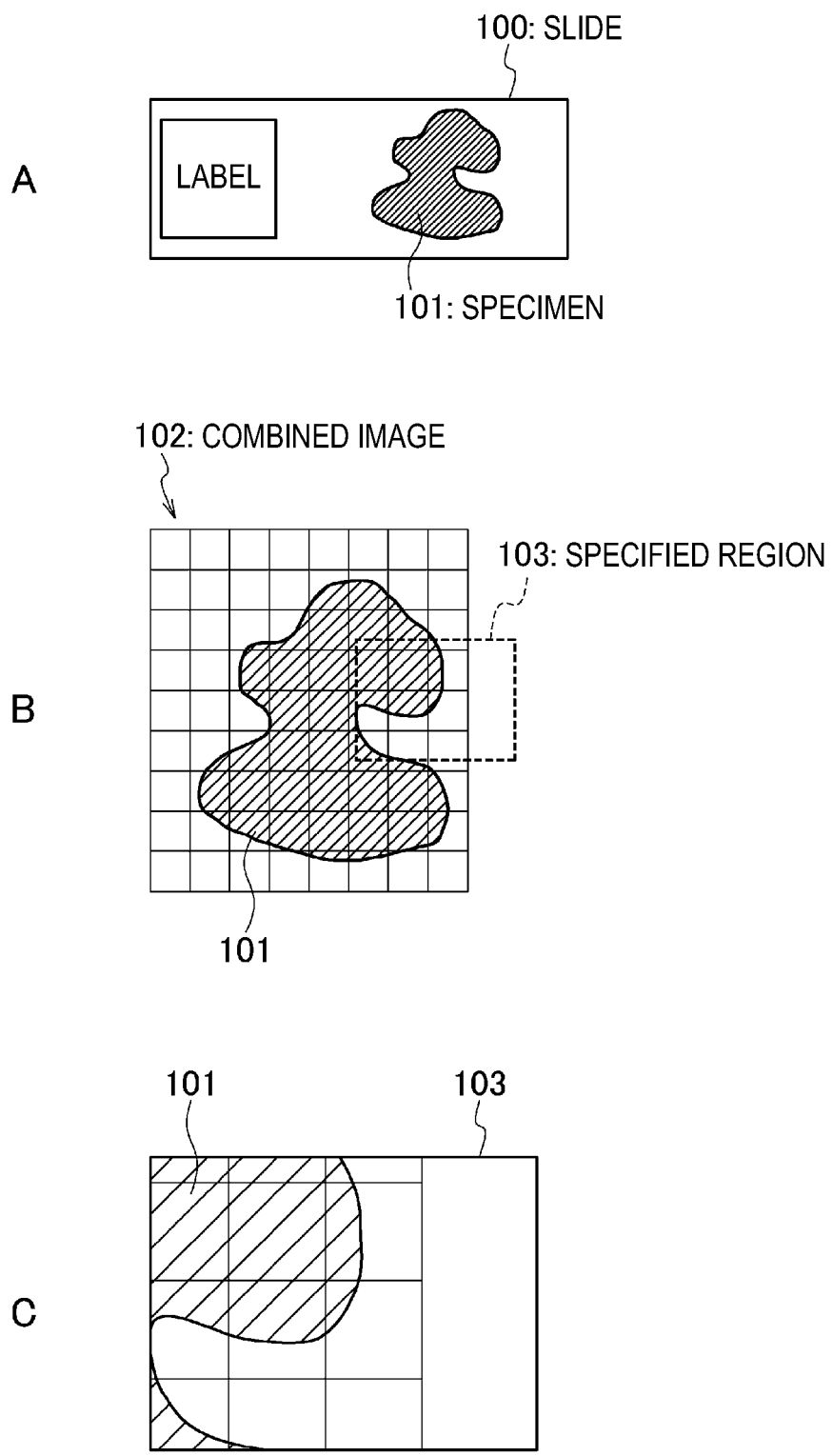
FIGS. 7A to 7C are figures which show display examples of connection information, where A shows an entire slide, B shows an entire combined image, and C shows a state of displaying on a display section.

A display mode of connection information is determined by the connection information processing section 43. FIGS. 7 to 13 are figures which show display examples of connection information. While the display modes of connection information are not particularly limited, connection positions can be displayed, for example, by straight lines. Specifically, in the case where a specimen 101 is imaged for the slide 100 shown in FIG. 7A, each connection position is shown on the combined image 102, such as shown in FIG. 7B. Also, as shown in FIG. 7C, a specified region 103 of the combined image 102 is displayed along with the connection positions on the display section 41.

In this case, it is desirable to change the display mode of the connection positions based on information related to the connection reliability. For example, in the case where the connection positions are shown by straight lines, the connection positions can be shown by changing the line color, the line thickness, the line type or the like. Specifically, in the display example shown in FIG. 8, parts with high connection reliabilities are shown by lines of a normal thickness, parts with medium reliabilities are shown by thick lines, and parts with low reliabilities are shown by double lines.

Figure 8:
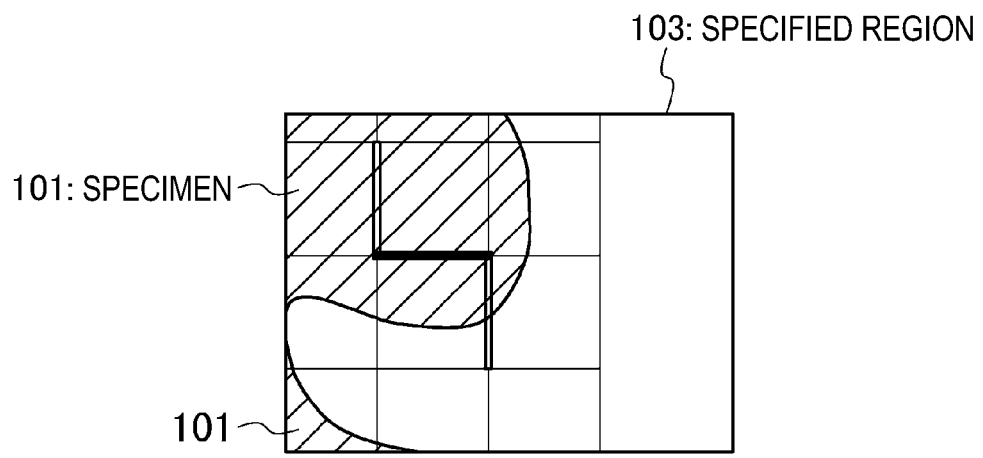
FIG. 8 is a figure which shows another display example of connection information.

Note that while all the connection positions are shown in FIG. 7 and FIG. 8, the present disclosure is not limited to this, and only the connection positions with low reliabilities may be displayed. Further, the display of the connection positions may not be by attaching lines, and may be by displaying a blank space without displaying an image of the connection parts.

Figure 9:
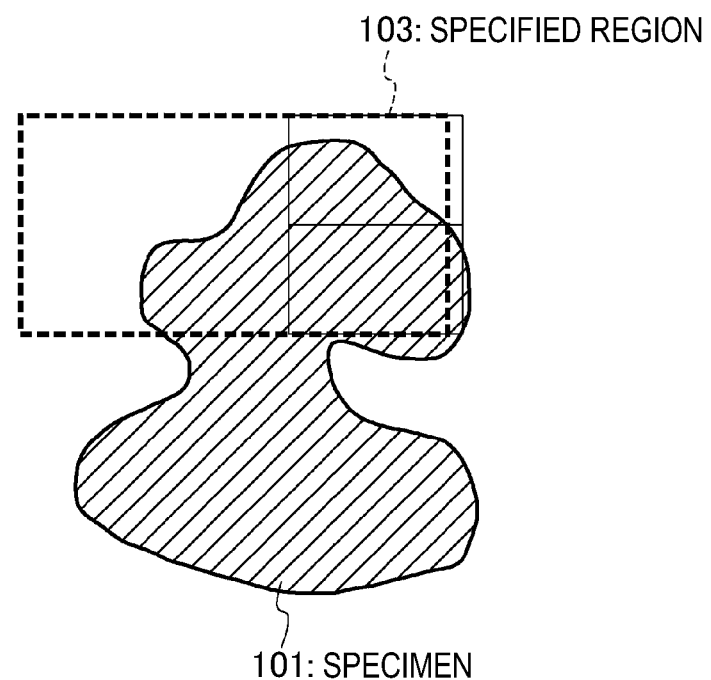
FIG. 9 is a figure which shows another display example of connection information.
Figure 10:
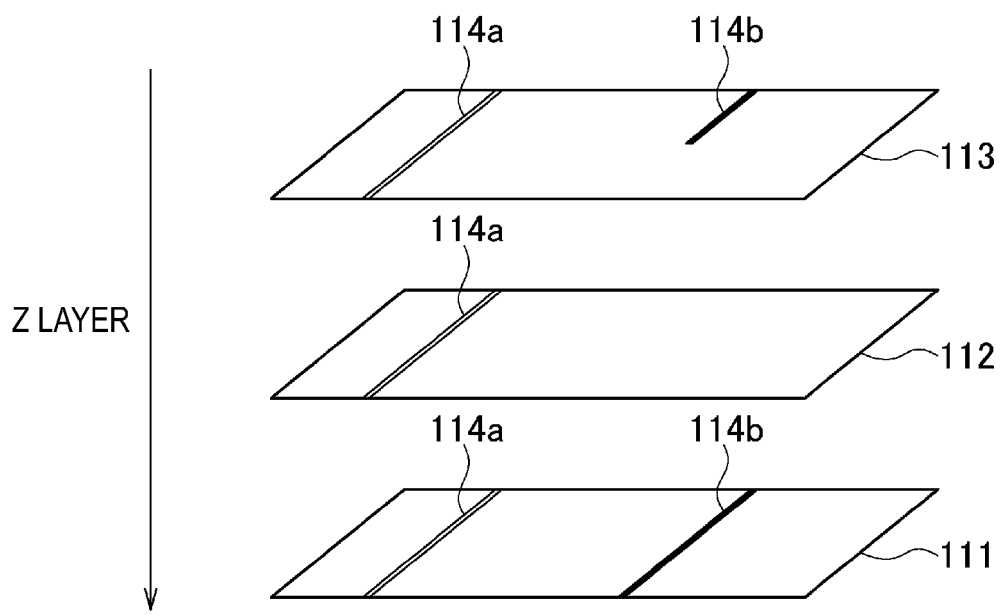
FIG. 10 is a figure which shows another display example of connection information.

Further, in the case where partial images with different sizes and magnifications are connected to each other, or in the case where partial images which are not in focus are connected to each other, the connection positions of the corresponding partial images can be displayed, as shown in FIG. 9. In addition, as shown in FIG. 10, in the case where there is a plurality of combined images (microscopic observation images) 111-113 with identical visual fields and resolutions and with only different focus positions, connection information 114a, 114b different for each focus position can be displayed.

On the other hand, the connection reliability information may not be displayed along with the connection positions. For example, as shown in FIG. 11A and FIG. 11B, in the case where a foreign body 104 is attached to the specimen 101, a marker 105 can be displayed attached to the position at which the foreign body 104 is located, such as shown in FIG. 11C. Note that in the case where a position or region of interest is shown related to the connection reliability, for example, in addition to a method which attaches a marker (mark) such as shown in FIG. 11C, a color such as white can be attached to this position or region, the color can be made thinner than the other regions, or the color can be changed.

Figure 12:
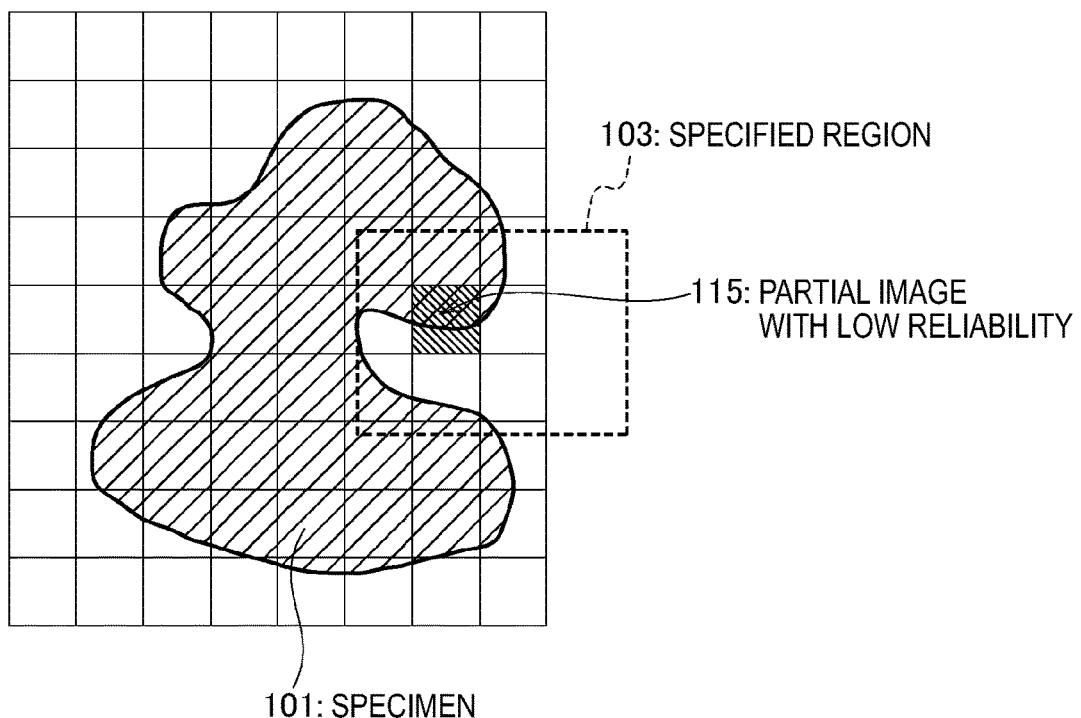
FIG. 12 is a figure which shows another display example of connection information.

Further, as shown in FIG. 12, for example, a color can be displayed attached to a partial image 115 with a low reliability, such as an image or the like to which a connection process with an adjacent partial image is not able to be done. Also, the display of this connection information is displayed by following a change of the displayed image. Specifically, in the case where the combined image is enlarged or reduced, the connection information, in accordance with this image, is also enlarged or reduced, and in the case where the display region of the combined image has moved, the connection information is displayed for the region after moving.

(Frame Buffer 44)

The frame buffer 44 temporarily stores the combined image (microscopic observation image) which is displayed on the display section 41.

(Information Input Section)

Note that a display information input section, in which information related to the combined image is input by a user, may be included in the image display apparatus 4. In this case, the information input by the user is transmitted from the image display apparatus 4 to the information processing apparatus 2 and the server 3 via the network 5, and is stored in an input information storage section. Here, while the information input by the user is not particularly limited, in the case where the information is used, for example, for pathological diagnosis, portions of note or of interest, the positions of foreign bodies and the like can be considered.

[Network 5]

The network 5 is a communication line network which mutually and bidirectionally communicably connects the information processing apparatus 2, the server 3 and the image display apparatus 4. This network 5 is constituted, for example, of a public network such as the internet, a telephone network or a satellite communication route, or a leased line network such as a WAN (Wide Area Network), a LAN (Local Area Network), an IP-VPN (Internet Protocol-Virtual Private Network), an Ethernet (registered trademark), a wireless LAN or the like, regardless of whether it is wired or wireless. Further, this network 5 may be a communication line network exclusively included in the microscope system of the present embodiment.

[Operations]

Figure 13:
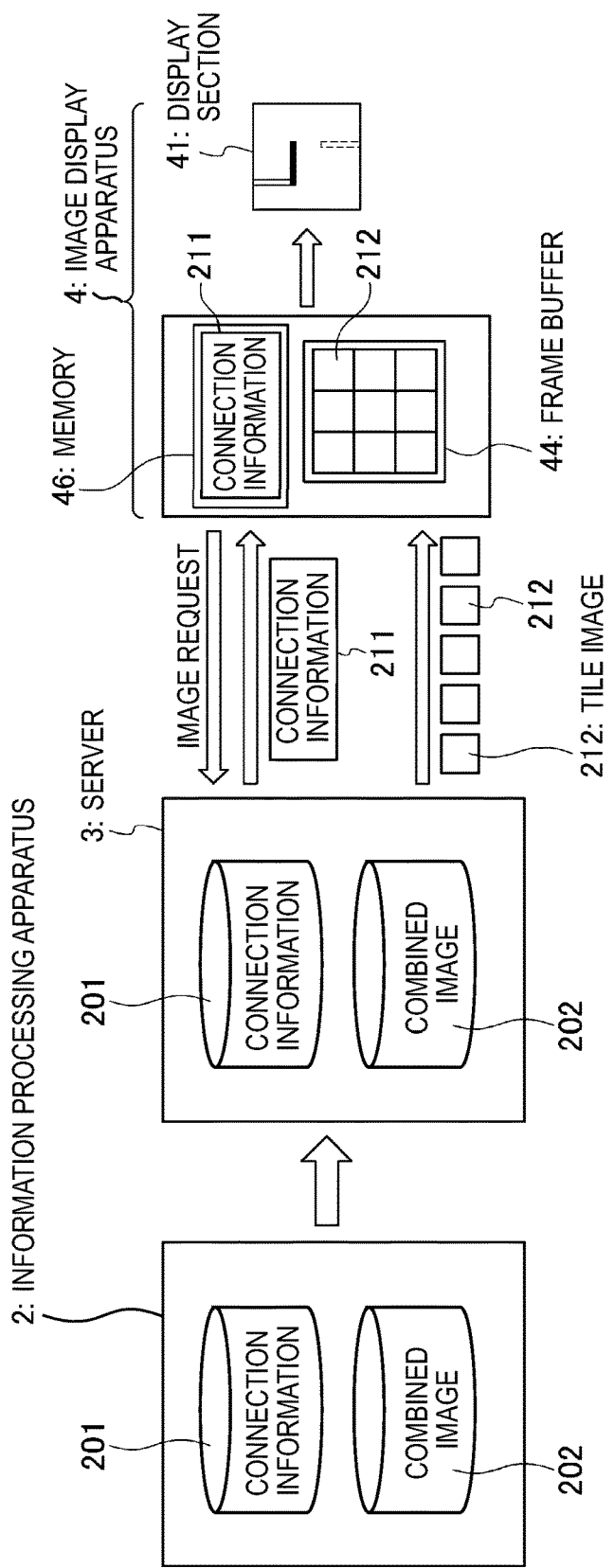
FIG. 13 is a figure which shows an outline for the operations which display connection information in the microscope system of the first embodiment of the present disclosure.
Figure 16:
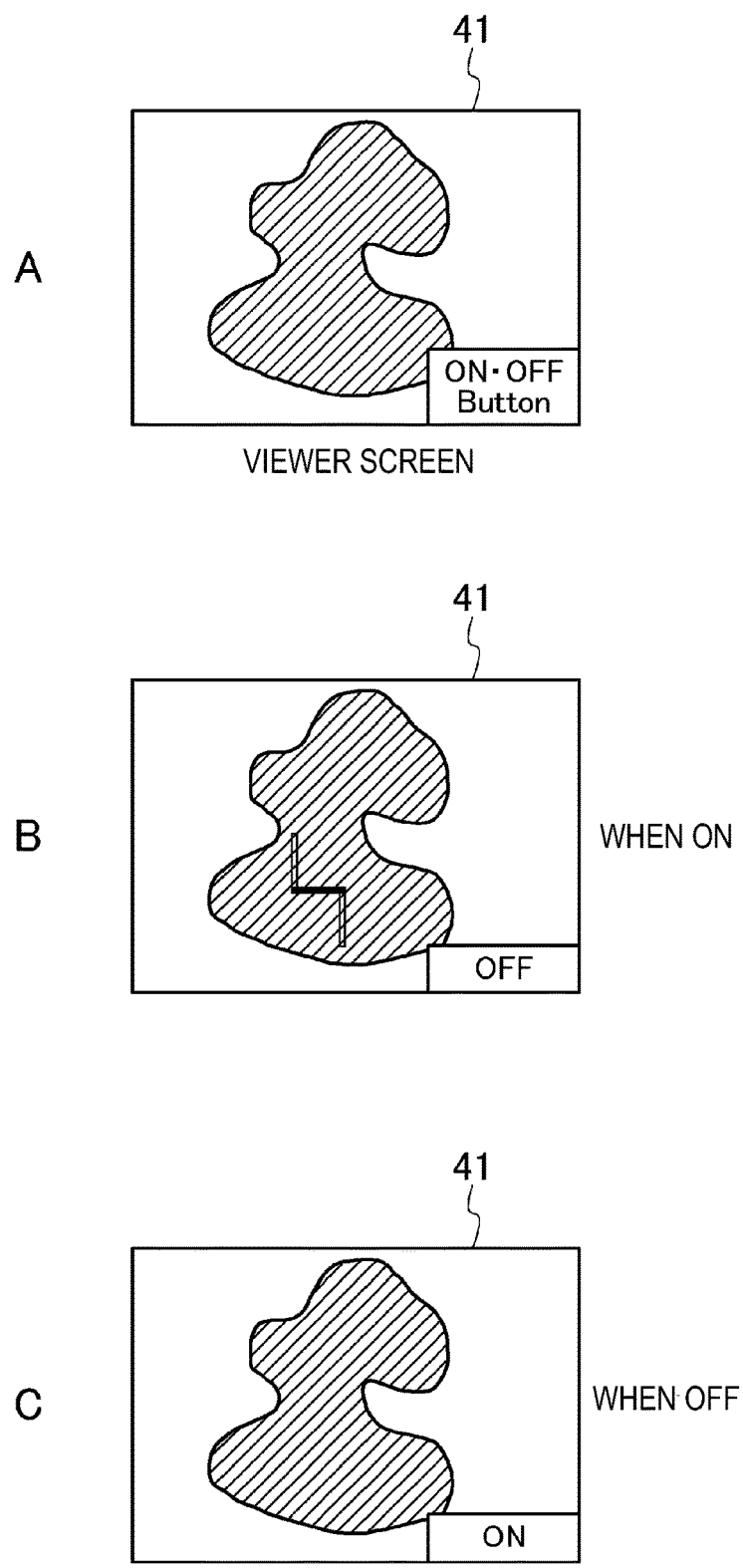
FIGS. 16A to 16C are figures which show the operations of the image display apparatus 4.

Next, a method which displays a microscopic observation image, by using the microscope system of the present embodiment, will be described. FIG. 13 is a figure which shows an outline for the operations which display connection information in the microscope system of the present embodiment. FIG. 14 is a figure which shows the flow for displaying the connection information, and FIG. 15 is a figure which shows a connection information example provided from the server 3 to the image display apparatus 4. FIGS. 16A to 16C are figures which show the operations of the image display apparatus 4.

As shown in FIG. 13, in the microscope system of the present embodiment, connection information 201 is created along with a combined image 202 in the information processing apparatus 2. This combined image 202 and connection information 201 are each transmitted to the server 3, and are stored in the database 32. Also, for example, as shown in FIG. 14, in the case where there is an instruction from a user for the display of the combined image, the image display apparatus (viewer) 4 requests information necessary for display to the server 3.

In contrast to this, the server 3 provides tile images 212, which correspond to the display region specified from the combined image 202, and connection information 211 or the like of the partial images which constitute the display region, in accordance with a request of the image display apparatus (viewer) 4. Also, each of the tile images 212 provided from the server 3 are stored in the frame buffer 44 of the image display apparatus (viewer) 4, and the connection information 211 is stored in the memory 46. Afterwards, a display mode of the connection information 211 is determined in the connection information processing section 43 of the image display apparatus (viewer) 4, and the connection information 211 is displayed on the display section 41 along with the tile images 212 stored in the frame buffer 44.

Here, basic information of imaging (imaging magnification, pixel number per one shot, the number of shots and the like), such as shown in FIG. 15A, for example, can be included as the information provided from the server 3. Further, when determining a display mode of the connection information, values which are managed by the image display apparatus (viewer), such as shown in FIG. 15B, can also be used. Also, when the parameters shown by FIGS. 15A and 15B are displayed, the image becomes an image such as that shown in FIG. 15C.

On the other hand, the combined image displayed on the display section 41 is constituted of tile images considerably smaller than the partial images. Also, a frame with a thick line shown in FIG. 15 shows which region of the combined image is displayed on the display section 41, and coordinates are set by an absolute coordinate system of the combined image with the top left as the origin. Further, the position (x,y) is converted into coordinates (0,0) within the display section 41 in the absolute coordinate system of a gigantic image. The image display apparatus (viewer) 4 normally draws while recognizing a relation between the top left origin (0,0) and the position (x,y) by the absolute coordinate system.

In the connection information processing section 43, for example, filling out the inside of the frame can be performed, by requesting how many frames enter within the display screen and what position (relative coordinates) these frames are at within the display screen. Further, at the time when the display magnification is changed, the frame position corresponding to the magnification is calculated, by changing the width and height per each partial image, along with the change of magnification, and it becomes possible to perform filling of the corresponding image or region.

In the microscope system of the present embodiment, since the connection information is created separately from the combined image (microscopic observation image), it is possible to switch between display/non-display of the connection information. Specifically, as shown in FIGS. 16A to 16C, a UI (User Interface) for the display/non-display of the connection information is included within the screen of the display section 41, and can be set to be selectable by a user.

As described above in the microscope system of the present embodiment, since connection information is created separately from the combined image, and the connection information is displayed along with the combined image, a user can easily recognize the reliability of the connected parts. In this way, it becomes possible for more accurate diagnosis in pathological diagnosis.

The Second Embodiment

Next, a microscope system according to a second embodiment of the present disclosure will be described. While above described microscope system of the first embodiment determines a display mode of connection information in the image display apparatus 4, the present disclosure is not limited to this, and may determine a display mode of connection information in the information processing apparatus 2 or the server 3.

Figure 17:
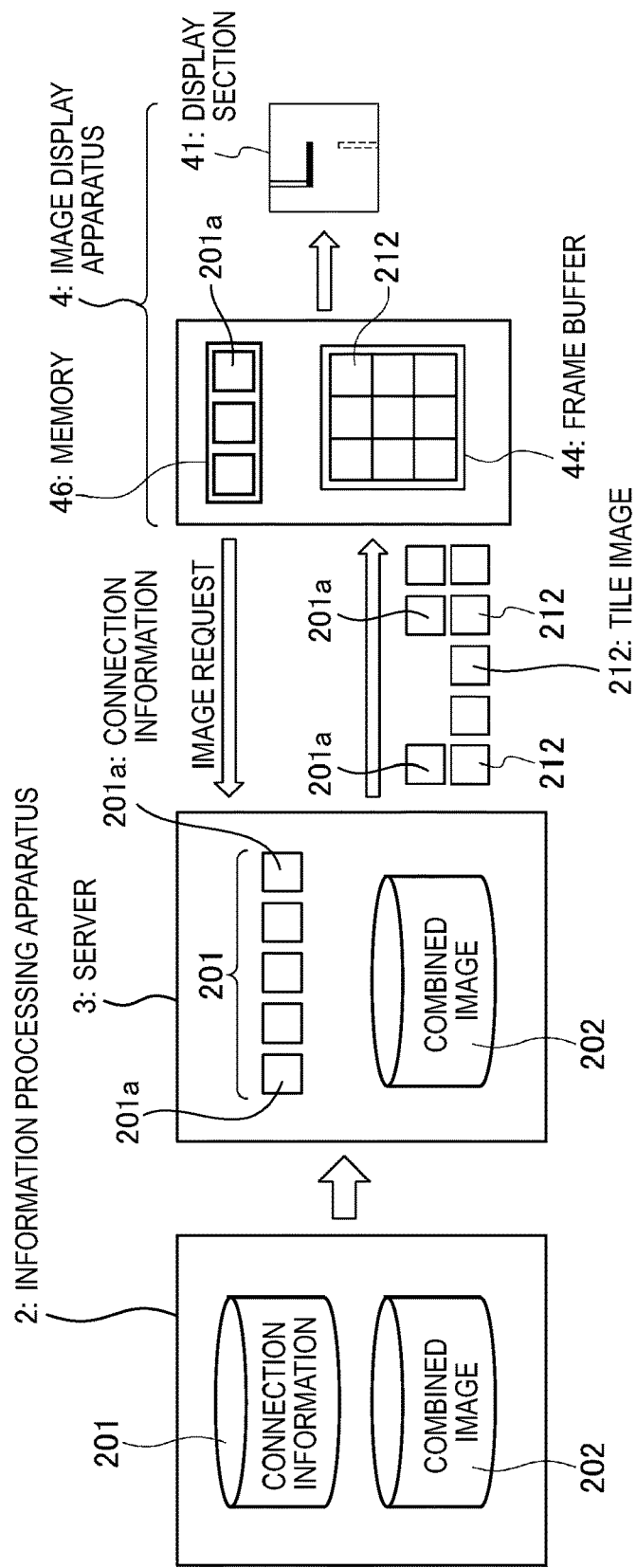
FIG. 17 is a figure which shows an outline for the operations which display connection information in a microscope system of a second embodiment of the present disclosure.
Figure 18:
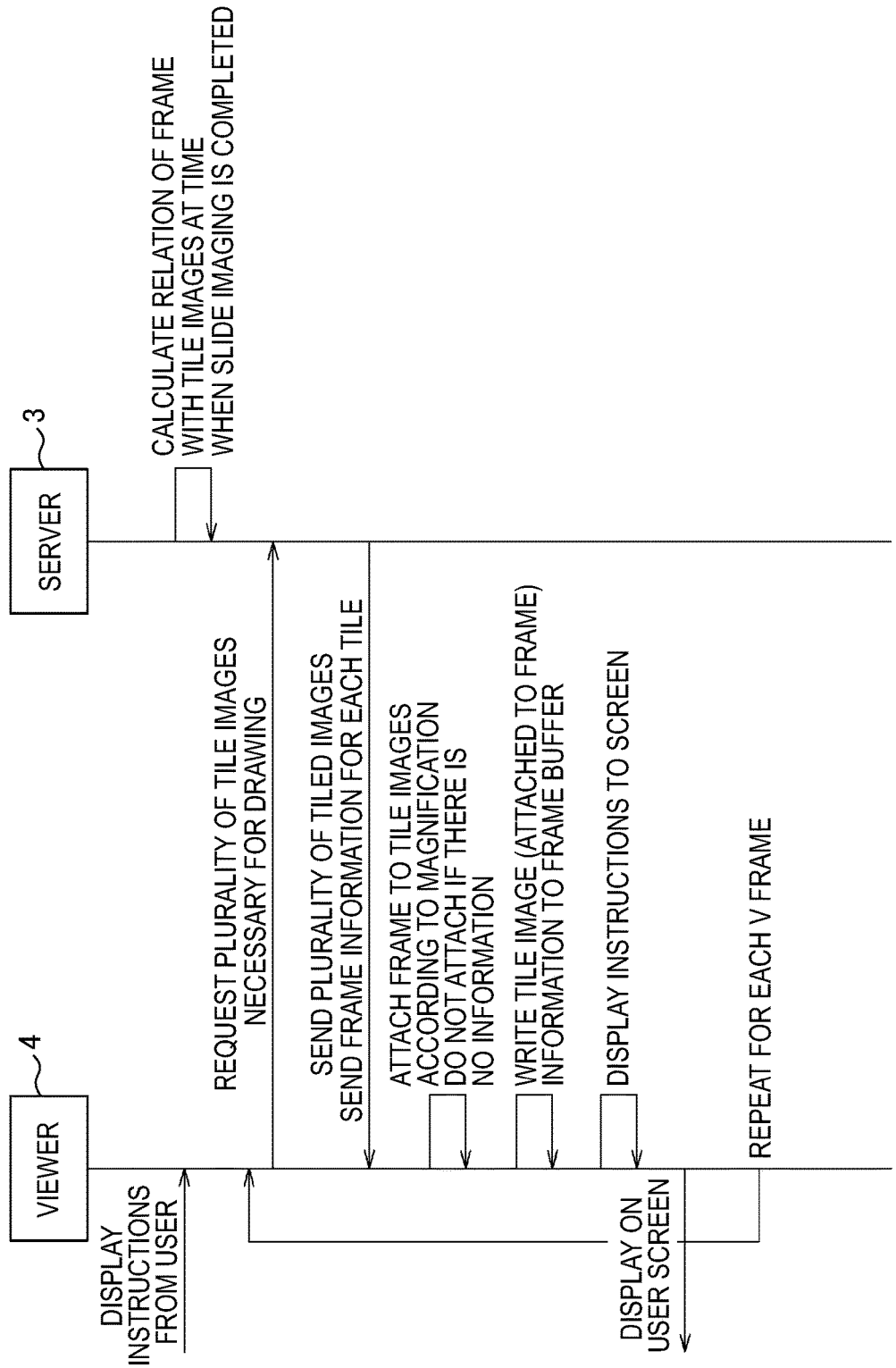
FIG. 18 is a figure which shows the flow for displaying connection information.
Figure 19:
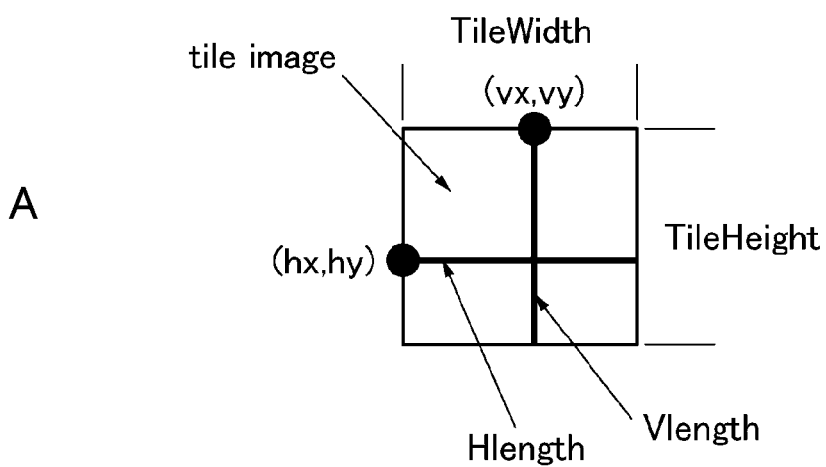
FIGS. 19A and 19B are figures which show a connection information example provided from the server 3 to the image display apparatus 4.

FIG. 17 is a figure which shows an outline for the operations which display connection information in the microscope system of the present embodiment. Further, FIG. 18 is a figure which shows the flow for displaying connection information. In addition, FIGS. 19 and 20 are figures which show connection information examples provided from the server 3 to the image display apparatus 4.

As shown in FIG. 17, in the microscope system of the present embodiment, the server 3 provides connection information 201a to the image display apparatus 4 as necessary, by attaching the connection information 201a to each tile image 212 requested from the image display apparatus 4. Specifically, a connection information processing section is included in the server 3, and connection information 201 transmitted from the information processing apparatus 2, by the CPU 33, is associated with each partial image of the combined image, and is stored in the database 32. Also, at the time when there is a request from the image display apparatus 4, connection information (frame information)

201*a*, in which a display mode is determined, is provided along with the tile images 212.

When a gigantic image is created by imaging and connecting a plurality of partial images, and this gigantic image is divided for each of the small tile images, a frame will be applied to the tiles of the borderline. Accordingly, the relation of the tile positions to the borderline is calculated by the server 3, and a list of frame information is stored in the database 32 for each of the tiles. For example, in the case where a frame (thick line) is entered and calculated for a tile image such as shown in FIG. 19A, information such as that of FIG. 19B may be calculated in advance, and may be registered in the database 32.

Also, in the case where an acquisition request of the tile images 212 comes from the image display apparatus 4, the connection information 201*a* of FIG. 19B is attached to the tile images 212. Note that, in the case of the combined image shown in FIG. 20A, since holding the frame position at an overall magnification is not realistic, it is preferable to hold the connection information (frame information) only for a number of magnifications, as shown in FIG. 20B.

Figure 21:
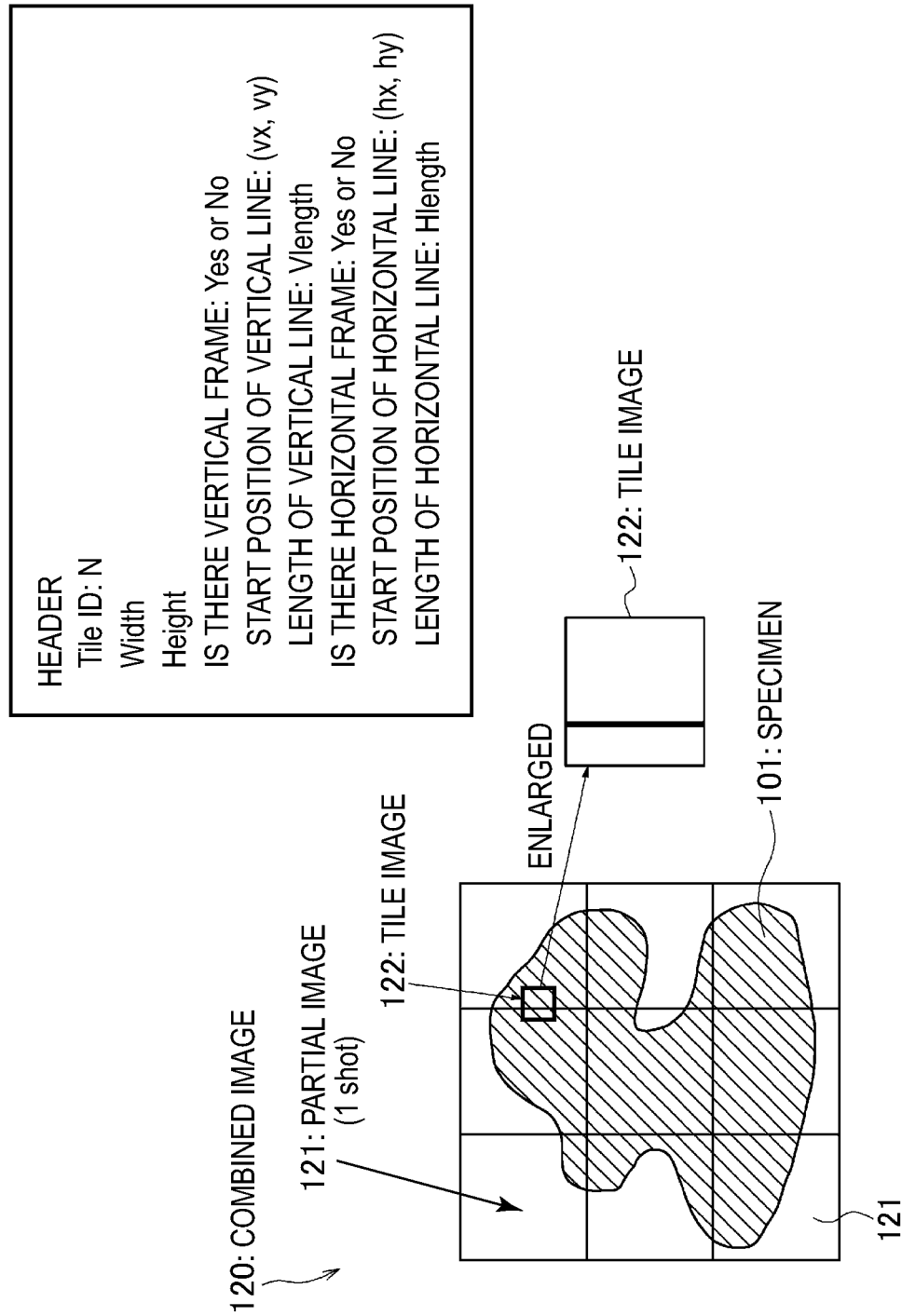
FIG. 21 is a figure which shows a combined image of the case where connection information is added to a tile image.

In addition, in the microscope system of the present embodiment, the display mode of connection information can be determined in the information processing apparatus 2, instead of in the server 3. FIG. 21 is a figure which shows a combined image of the case where connection information is attached to the tile images. In this case, when tile images 122 are created in the information processing apparatus 2, such as in the combined image 120 shown in FIG. 21, connection information of the partial images 121 is added to the headers of the tile data. In this way, the processes in the server 3 and the image display apparatus 4 become unnecessary. For example, it is also possible to attach information such as a foreign body marker to the tile headers.

In the microscope system of the present embodiment, since the display mode of connection information is determined by the server 3 and the information processing apparatus 2, the load of processing can be reduced in the image display apparatus 4. In this way, it becomes possible to increase the drawing speed (display speed).

Note that the configurations and effects other than those described above in the microscope system of the present embodiment are similar to those of the above described first embodiment.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus, including:
an image combination section which connects a plurality of partial images, each of which is an image obtained by imaging a part of a region to be observed; and
a connection information generation section which generates connection information of a combined image combined by the image combination section,
wherein the connection information is provided, along with the combined image or separately from the combined image, to an image display apparatus capable of displaying the combined image.

(2) The information processing apparatus according to (1),
wherein the connection information includes at least a connection position of the partial image and a connection reliability in the connection position.

(3) The information processing apparatus according to (2),
wherein information related to the connection reliability is a connection accuracy and/or a presence or absence of distortion of each partial image.

(4) The information processing apparatus according to (2) or (3),
wherein a display mode of the connection information is additionally changed based on the information related to the connection reliability.

(5) The information processing apparatus according to any one of (2) to (4),
wherein the connection information additionally includes information related to a presence or absence of a foreign body and/or a position of the foreign body.

(6) The information processing apparatus according to any one of (1) to (5), further including:
an input information storage section which stores information related to the combined image input by a user,
wherein the information stored in the input information storage section is also provided to the image display apparatus along with the connection information.

(7) An information processing method, including:
connecting, by an image combination section, a plurality of partial images, each of which is an imaged part of a region to be observed;
generating, by a connection information generation section, connection information of a combined image combined by the image combination section; and
providing the connection information, along with the combined image or separately from the combined image, to an image display apparatus capable of displaying the combined image.

(8) A program for causing an information processing apparatus to execute:
an image combination function which connects a plurality of partial images, each of which is an imaged part of a region to be observed;
a connection information generation function which generates connection information of a combined image combined by the image combination section; and
a function which provides the connection information, along with the combined image or separately from the combined image, to an image display apparatus capable of displaying the combined image.

(9) An image display apparatus, including:
an image acquisition section which acquires a combined image obtained by connecting a plurality of partial images, each of which is an imaged part of a region to be observed;
a connection information acquisition section which acquires connection information of the combined image; and
a display section which displays the combined image and/or the connection information.

(10) The image display apparatus according to (9),
wherein the connection information includes at least a connection position of the partial image and a connection reliability in the connection position.

(11) The image display apparatus according to (10), further including:
a connection information processing section which determines a display mode of the connection position based on information related to the connection reliability,
wherein the display section displays the connection position by the display mode determined by the connection information processing section.

(12) The image display apparatus according to any one of (9) to (11), further including:

an information input section to which a user inputs information related to the combined image.

The present disclosure contains subject matter related to that disclosed in Japanese Priority Patent Application JP 2012-169607 filed in the Japan Patent Office on Jul. 31, 2012, the entire content of which is hereby incorporated by reference.

What is claimed is:

1. An information processing apparatus, comprising:
a central processing unit (CPU) configured to:
connect a plurality of partial images to obtain a combined image, wherein the plurality of partial images are obtained by imaging a region to be observed;
generate connection information of the combined image, wherein the connection information includes:
at least a plurality of connection portions of the plurality of partial images and connection reliability information of the plurality of connection portions, and
information related to at least one of a presence of a foreign body or a position of the foreign body;
change a display mode that corresponds to a connection portion of the plurality of connection portions, between two adjacent partial images of the plurality of partial images based on the connection reliability information corresponding to the connection portion; and
supply the display mode, the connection information and the combined image to an image display apparatus that displays the combined image.

2. The information processing apparatus according to claim 1, wherein the connection reliability information is calculated based on at least one of a connection accuracy or a presence of distortion in each partial image of the plurality of partial images.

3. The information processing apparatus according to claim 1, wherein the CPU is further configured to store information, related to the combined image, input by a user, wherein the stored information is supplied to the image display apparatus along with the connection information.

4. The information processing apparatus according to claim 1, wherein the connection portion of the plurality of connection portions, between the two adjacent partial images is displayed by a line.

5. The information processing apparatus according to claim 1, wherein the CPU is further configured to determine the connection reliability information based on a deviation between the two adjacent partial images of the plurality of partial images.

6. An information processing method, comprising:
in an information processing apparatus:
connecting a plurality of partial images to obtain a combined image, wherein the plurality of partial images are obtained by imaging a region to be observed;
generating connection information of the combined image, wherein the connection information includes:
at least a plurality of connection portions of the plurality of partial images and connection reliability information of the plurality of connection portions, and
information related to at least one of a presence of a foreign body or a position of the foreign body;
changing a display mode that corresponds to a connection portion of the plurality of connection portions, between two adjacent partial images of the plurality of partial images, based on the connection reliability information corresponding to the connection portion; and
supplying the display mode, the connection information and the combined image to an image display apparatus that displays the combined image.

7. The information processing method according to claim 6, further comprising receiving, from a user, information related to the combined image.

8. The information processing method, according to claim 6, wherein the connection reliability information comprises at least one of a connection accuracy or a presence of distortion of each partial image of the plurality of partial images.

9. A non-transitory computer-readable medium having stored thereon computer-executable instructions for causing a computer to execute operations, the operations comprising:
connecting a plurality of partial images to obtain a combined image, wherein the plurality of partial images are obtained by imaging a region to be observed;
generating connection information of the combined image, wherein the connection information includes:
at least a plurality of connection portions of the plurality of partial images and connection reliability information of the plurality of connection portions, and
information related to at least one of a presence of a foreign body or a position of the foreign body;
changing a display mode that corresponds to a connection portion of the plurality of connection portions, between two adjacent partial images of the plurality of partial images, based on the connection reliability information corresponding to the connection portion; and
supplying the display mode, the connection information and the combined image to an image display apparatus that displays the combined image.

10. The non-transitory computer-readable medium, according to claim 9, wherein the connection reliability information comprises at least one of a connection accuracy or a presence of distortion in each partial image of the plurality of partial images.

11. An image display apparatus, comprising:
a central processing unit (CPU) configured to:
acquire a combined image, wherein the combined image is obtained by a plurality of partial images that are connected, wherein the plurality of partial images are obtained by a region to be observed that is imaged;
acquire connection information of the combined image; and
control display of the combined image, wherein the connection information includes:
at least a plurality of connection portions of the plurality of partial images and connection reliability information of the plurality of connection portions, and
information related to at least one of a presence of a foreign body or a position of the foreign body; and
change a display mode that corresponds to a connection portion of the plurality of connection portions, between two adjacent partial images of the plurality of partial images, based on the connection reliability information that corresponds to the connection portion.

12. The image display apparatus, according to claim 11, wherein the connection reliability information comprises at least one of a connection accuracy or a presence of distortion in each partial image of the plurality of partial images.

* * * * *